United States Patent [19]

Anderson et al.

[11] Patent Number: 4,857,851
[45] Date of Patent: Aug. 15, 1989

[54] FIXING A GEOGRAPHICAL REFERENCE OF A VEHICLE TRAVELING THROUGH A PIPELINE

[75] Inventors: Donald W. Anderson, Gosforth; Charles W. Gregory, Blyth, both of England

[73] Assignee: British Gas Corporation, London, England

[21] Appl. No.: 695,750

[22] Filed: Jan. 29, 1985

Related U.S. Application Data

[63] Continuation of Ser. No. 415,932, Sep. 8, 1982, abandoned.

[30] Foreign Application Priority Data

Sep. 23, 1981 [GB] United Kingdom ............... 8128728

[51] Int. Cl.⁴ ..................... G01V 3/08; G01N 27/72
[52] U.S. Cl. .................................. 324/326; 324/227; 324/226; 324/220
[58] Field of Search ............... 324/67, 220, 219, 221, 324/326, 327, 226, 227; 33/356, 357

[56] References Cited

U.S. PATENT DOCUMENTS

| 2,092,951 | 9/1947 | Blake | 324/67 |
| 2,379,447 | 7/1945 | Lindsey | 324/67 X |
| 3,693,075 | 9/1972 | Förster | 324/220 X |
| 3,754,275 | 8/1975 | Carter et al. | 324/67 X |
| 3,878,453 | 4/1975 | Potter et al. | 324/67 X |
| 3,991,361 | 11/1976 | Mattern et al. | 33/356 X |

Primary Examiner—Reinhard J. Eisenzopf
Assistant Examiner—W. Edmonds
Attorney, Agent, or Firm—Watson, Cole, Grindle & Watson

[57] ABSTRACT

In a pipeline through which a vehicle such as a pig is travelling, a magnetically activated detector detects the presence of the approaching pig and sends a signal to switch on a transmitter unit which supplies an alternating current to an AC coil. This generates a magnetic field for a preselected period, the flux signal being then sensed by a pair of crossed coil sensors on board the pig after which the signal is processed in a unit on-board the pig. A reference pulse is then output for recording on a tape recorder also on-board the pig. This technique enables a geographical reference of the vehicle to be fixed.

24 Claims, 4 Drawing Sheets

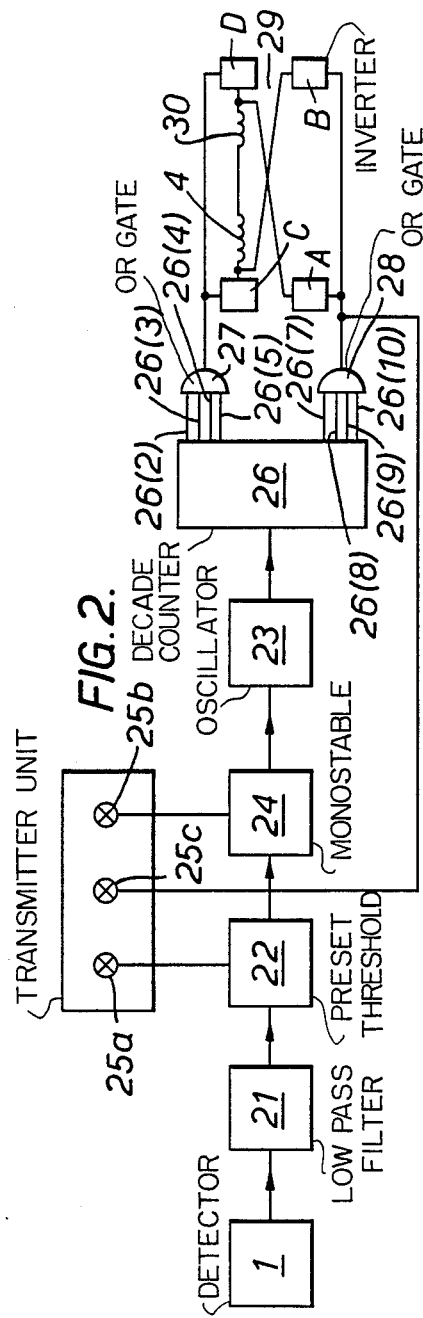
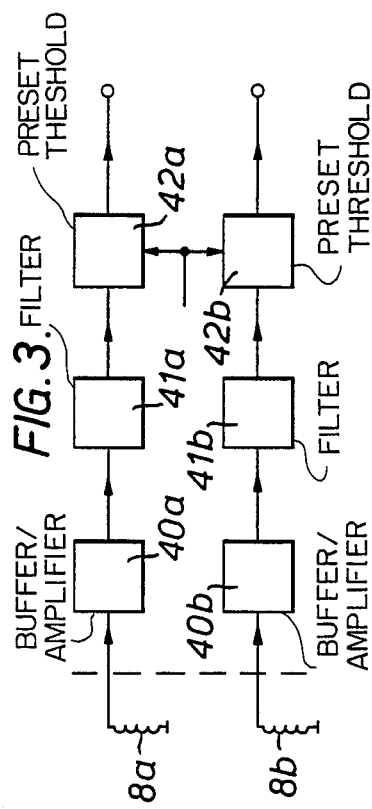
FIG. 2.
FIG. 3.

FIXING A GEOGRAPHICAL REFERENCE OF A VEHICLE TRAVELING THROUGH A PIPELINE

This application is a continuation of application Ser. No. 415,932, filed Sept. 8, 1982 now abandoned.

BACKGROUND OF THE INVENTION

The present invention relates to the fixing of a geographical reference of a vehicle travelling through a pipeline.

It is now well known to inspect a natural gas transmission pipeline for structural defects, such as cracks and corrosion pits, by sending through the pipeline a so called "intelligent pig". The intelligent pig is propelled through the pipeline by the pressure of the gas so that the inspection can be performed while maintaining the gas supply. The pig incorporates means for generating a magnetic flux for establishing a magnetic field in the pipeline, and magnetic flux-sensing coils incorporated in the pig detect any irregularities in the pipeline wall, such as cracks, pits and like, which cause irregularities in the pipeline flux. Instead of or in addition to generating magnetic flux, the pig may incorporate means for generating an ultrasonic signal for transmission into and reflection from the wall. Ultrasonic sensors also incorporated in the pig sense the reflected signal which is irregular if reflected from irregularities, such as defects in the pipeline wall. The signals detected by the magnetic flux or ultrasonic signal sensors are recorded on tape and can be processed and analysed to determine the type of and extent of the defect so that the relevant defective section of the pipeline can be repaired or replaced.

Clearly it is necessary to match the appropriate defect signal to the precise location of the defect in the pipeline, in other words to fix a geographical reference or line marker of the defect. It is also a requirement that such a system should permit such matching to be made without the need to expose the external wall of the pipeline.

Normal progress of the pig through the pipe is measured by footage wheels mounted on it. While the distance measured by these wheels can be used to fix a reference for the defects, the wheels may slip, and over long distances their absolute measurement may not be accurate enough to enable an accurate fix of the defect to be made. Tees or other devices may be used to provide intermediate pipeline references, but in a region devoid of such features this is impossible.

It is therefore an object of the present invention to fix a geographical reference for the vehicle as it travels through the pipeline without the above disadvantage and without the necessity to expose the external wall of the pipeline.

SUMMARY OF THE INVENTION

According to one aspect of the present invention, there is provided a method for fixing a geographical reference of a vehicle travelling through a pipeline, the method comprising detecting the presence of the vehicle in the pipeline at a selected point externally of the pipeline, transmitting a signal from a selected reference point externally of the pipeline when the vehicle is detected and sensing and recording the signal on-board the vehicle.

Preferably the signal is continuous, but suitably is only transmitted for a limited period.

Conveniently the signal is transmitted as magnetic flux from an AC coil transmitter supplied with alternating current at a frequency of no more than 30 Hz. The alternating current frequency is desirably no less than 16 Hz, but preferably the frequency is 20 Hz.

Preferably the sensed signal is processed on board the vehicle so as to provide a reference pulse for recording on board the vehicle. Suitably the reference pulse is output as soon as or after the signal has ceased to be sensed.

In a preferred embodiment of the invention, the reference pulse is output when the distance travelled by the vehicle after it has reached the transmitter coincides with a reference distance equal to or greater than half the distance travelled by the vehicle between the points, respectively, when the signal is first sensed and ceases to be sensed.

According to another aspect of the present invention, there is provided apparatus for fixing a geographical reference of a vehicle travelling through a pipeline, the apparatus comprising a detector for detecting the presence of the vehicle in the pipeline at a selected point externally of the pipeline, a transmitter responsive to the detector for transmitting a signal from a selected reference point externally of the pipeline, and, on board the vehicle, a sensor for sensing the signal and means responsive to the sensor for recording the signal.

Preferably the transmitter is adapted to transmit a continuous signal, and suitably means are provided to limit the period of transmission of the signal.

Conveniently the transmitter includes an AC coil for transmitting the signal as a magnetic flux.

Preferably means are provided on board the vehicle to process the signal when sensed by the sensor and to output a reference pulse for recording on board the vehicle.

Suitably the signal processing means is adapted to output the reference pulse as soon as or after the signal has ceased to be sensed by the sensor.

In a preferred embodiment the signal processing means is adapted to output the reference pulse when the distance travelled by the vehicle after it has reached the transmitter coincides with a reference distance equal to or greater than half the distance travelled by the vehicle between the points, respectively, when the signal is first sensed and ceases to be sensed.

Preferably the sensor comprises a pair of crossed receiver coils whose axes are perpendicular to each other.

DESCRIPTION OF THE DRAWINGS

An embodiment of the invention will now be particularly described by way of example only with reference to the accompanying drawings in which:

FIG. 2 is a schematic block diagram of the components of the transmitter, FIG. 3 is a schematic block diagram of the analogue signal processing part of the receiver system on board the pig.

DESCRIPTION OF THE PREFERRED EMBODIMENT

Figure 1:
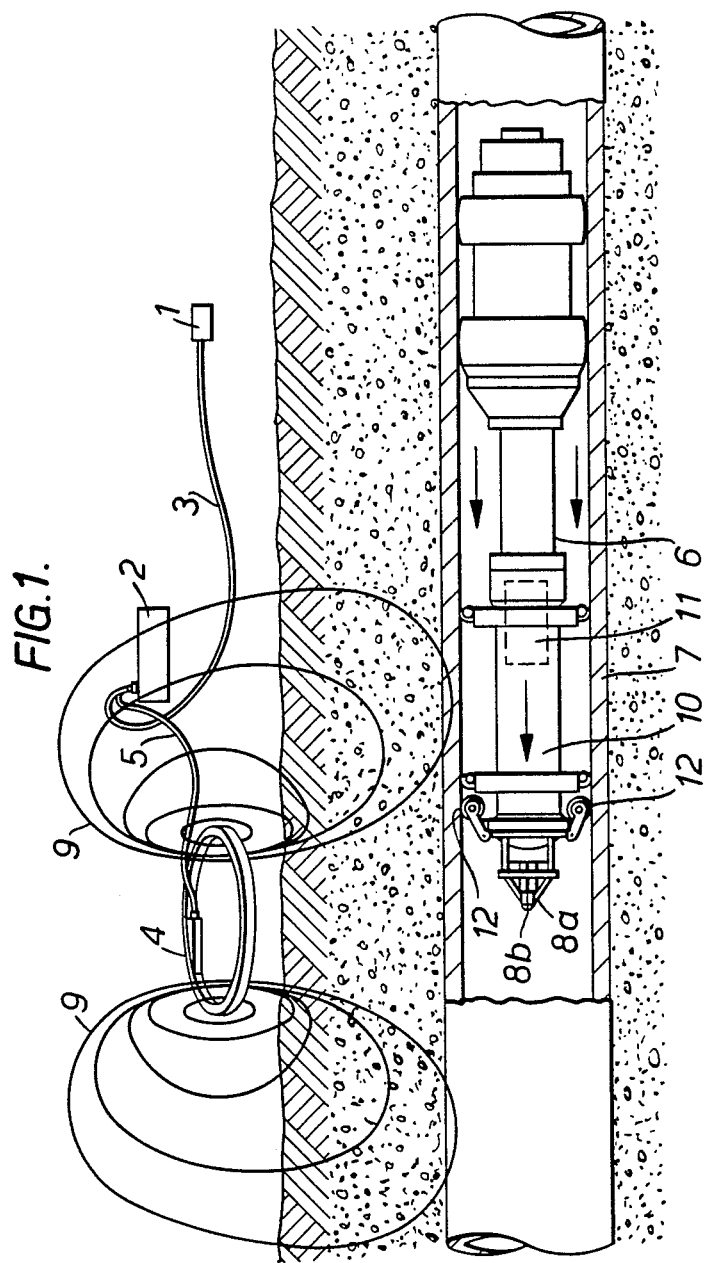
FIG. 1 is a schematic view of the apparatus in accordance with the present invention.

Referring to the drawings, the apparatus comprises a pig detector coil 1, a transmitter unit 2 connected by a lead 3 to the coil 1, a conventional AC coil 4 connected by a lead 5 to the transmitter unit 2, and an intelligent pig 6 in use, urgable along the pipeline 7 by the pressure of the gas flowing in the pipeline 7. The pig 6 includes sensor coils 8a and 8b for sensing the magnetic flux signal generated as flux lines 9 by the AC coil 4 and an on-board signal receiving and processing system housed in the front 10 of the pig 6 together with an on-board tape recorder 11.

The pig 6 is of conventional design, apart from the sensor coils 8 and the signal processing system, and includes inter alia the usual magnetic flux generators and sensors (not shown) as well as the resilient wheels 12 housing ultrasonic transducers for contact with the pipeline.

The detector 1 is an air cored coil placed on the ground directly above the pipe, with its axis parallel to the direction of the pipe and upstream of the transmitter coil 4.

In essence the method of the invention involves a signal being generated in the detector coil 1 by the relative motion of the magnets on the approaching pig 6. This signal is then transmitted via the lead 3 to the transmitter unit 2 which is switched on by the signal. The transmitter unit 2 energises the AC coil 4 via the lead 5 to transmit a magnetic flux signal for a limited period, say 17 seconds, whilst the pig 6 passes beneath the coil 4. The transmitter output coil 4 generates a low frequency magnetic field, some of which penetrates the pipeline 7 for a short distance on either side of the coil 4. The penetrating magnetic field sensed by the sensor or detector coils 8 mounted on the front of the pig 6 and the signal receiver and processing means within the pig 6 (to be described) processes the sensed signal to produce a final reference output pulse or signal which gives the position or "line marker" at which the pig 6 passes directly beneath the coil 4.

Referring to FIG. 2, the signal generated in the detector coil 1 is transmitted to the transmitter unit where it is filtered by a low pass filter 21 which has a cut off at 10 Hz and is then compared to a preset threshold 22. When the threshold is exceeded an oscillator 23 is enabled by a monostable 24 for a period of 17 seconds. Before the threshold is exceeded, lamp 25a on the transmitter is lit, indicating that the transmitter unit is "waiting" for a detector signal. When the monostable reverts to its stable state after 17 seconds, it energises another lamp 25b on the transmitter unit and extinguishes the lamp 25a.

The oscillator 23 is crystal controlled and has a frequency of 3.2678 MHz, which is divided by $2^{14}$ by a divider incorporated in the oscillator 23 to provide an output frequency of 200 Hz. This is applied to the clock input of a decade counter 26. The decade counter 26 has ten sequential outputs, the first and sixth not being used. Outputs 26(2), 26(3), 26(4) and 26(5) form inputs to an OR gate 27 while outputs 26(7), 26(8), 26(9) and 26(10) form inputs to an OR gate 28. When enabled by its sequential inputs, OR gate 27 turns on arms A and B of an inverter (generally indicated by reference numeral 29) so that current flows in a positive direction through the transmitter AC output coil 4 shown as connected to the inverter 29. When enabled by its sequential inputs, OR gate 28 turns on arms C and D of the inverter 29 so that current flows in a negative direction through the output coil 4. As shown, current flowing in the output coil 4 also flows through a relay coil 30, which energises a further lamp 25c on the transmitter unit. This lamp 25c thereby indicates that the oscillator 23 has been enabled. This lamp 25c extinguishes when lamp 25b is lit after the monostable has reverted to its stable state. The lamps 25 may be of different colours for easy recognition. The alternating current flow thus generated in the output coil 4 causes this coil 4 to generate a magnetic field as shown in FIG. 1.

Referring to FIG. 3, the magnetic signal generated by the output coil 4 is sensed by the pair of sensor coils 8a and 8b which are each provided with an analogue signal processing channel as shown in FIG. 3, each channel being identical. The signals from each sensor coil 8a and 8b are buffered and amplified by buffer/amplifiers 40a and 40b and then filtered in filters 41a and 41b. The filters 41a and 41b are band pass with a lower cut off frequency of 16 Hz and a higher cut off frequency of 25 Hz. Their out of band signal rejection is −24 dB/Octave above and below the cut off frequencies.

The filtered signals are then compared to preset thresholds 42a and 42b, the thresholds being variable and determining receiver sensitivity. Voltages exceeding this threshold produce a digital high and those below it a digital low. This results in a 20 Hz square wave pulse train which is ready for digital processing.

Figure 4:
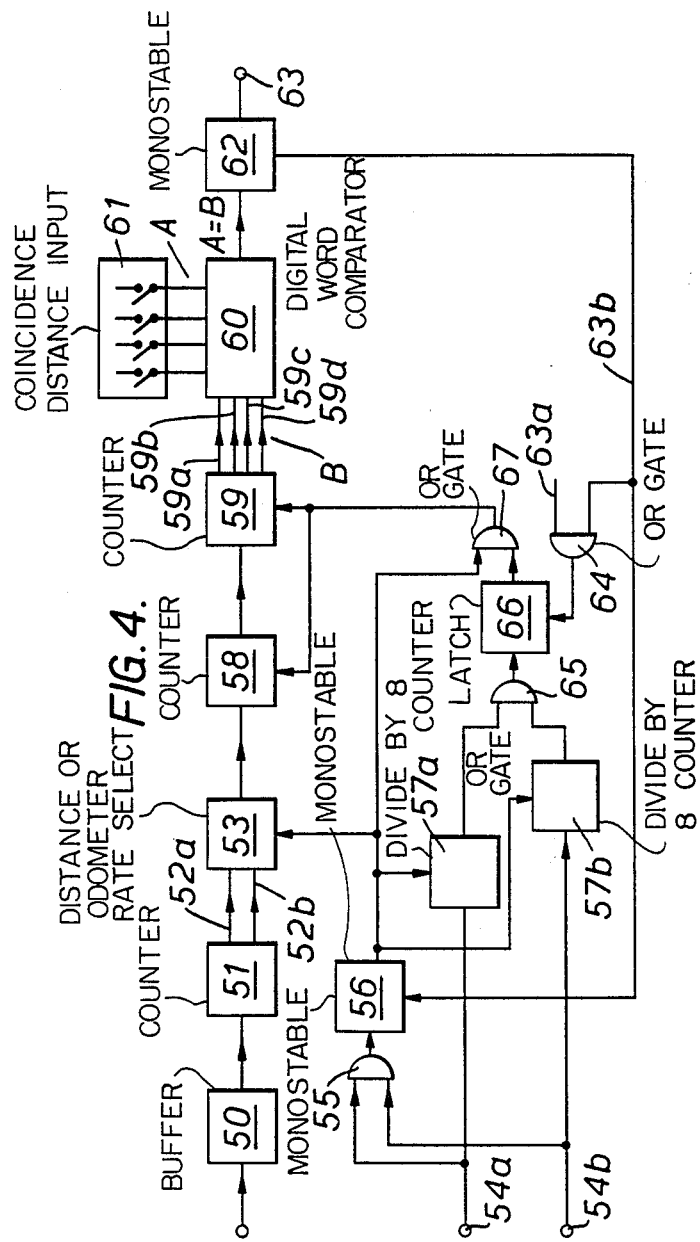
FIG. 4 is a schematic block diagram of the digital signal processing part of the receiver system on board the pig.

Referring to FIG. 4, while not shown the pig 6 is provided with a distance transducer, such as a pulse tachometer, for generating footage pulses, which runs continuously while the pig moves along the pipeline. The output from this transducer is supplied after conditioning as a direct digital input of 768 pulses per meter (ppm) to a first channel of the digital signal processing part of the receiver system shown in FIG. 4. The signal is buffered by buffer 50 and then used as a clock input to a counter 51. Two outputs are taken from this counter 51, one output 52a being a division by 2, and another output 52b being a division by 4 of the distance signal, thus producing divided output signals of 384 ppm and 192 ppm, respectively. These outputs form the inputs to a distance or odometer rate select 53.

Meanwhile, the square wave output signals from the thresholds 42a and 42b (shown in FIG. 3) are supplied as input signals 54a and 54b to an OR gate 55 in FIG. 4 to enable a monostable 56 (for a period of 82 ms) so that the monostable output is high while the received signals (in the form of square wave pulses) are applied. The output of the monostable 56 has three functions:

(a) To switch the output of the odometer rate select 53 from 384 ppm to 192 ppm.

(b) To enable received signal counters 57a and 57b, and (c) To enable counters 58 and 59 until the reference pulse has been generated.

When enabled, the counter 58 counts the odometer pulses and divides the count down to 3 ppm. These divided down pulses clock a counter 59 which is respectively provided with outputs 59a, 59b, 59c and 59d having $2^1$, $2^2$, $2^3$, and $2^4$ outputs. These outputs form a signal B input to a digital word comparator 60. The "jam" A inputs from a coincident distance input 61 are set to obtain the selected coincidence delay distance in meters which is also input to the word comparator 60. When this distance has elapsed (that is A inputs=B inputs and 7680 odometer pulses have been received) a pulse is generated at the A=B output of the word comparator 60. This triggers an output reference pulse from a monostable 62 which is recorded on a tape of tape recorder connected to the output 63. This output reference pulse is also used to reset the receiver at an OR gate 64 on line 63a.

To prevent the recording of spurious pulses, a 100 ms pulse is applied on switch on to monostable 62, OR gate 64 on line 63b and to the output of OR gate 55 (not shown). In addition, the line marker signals 54a and 54b are applied to the clock inputs of divide by 8 counters 57a and 57b, respectively. When either of these counters have counted eight pulses, a logic high signal is generated at the output of an OR gate 65. This logic high signal is applied to a latch 66, thus enabling the counters 58 and 59 by way an OR gate 67 which is also enabled by a signal from the monostable 56. The logic high signal is present until it is cleared by an output reset pulse supplied on the output line 63a of the OR gate 64.

Figure 5:
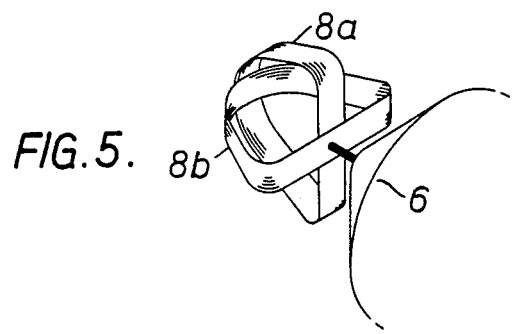
FIG. 5 is a perspective view from the rear of the two crossed receiver coils on board the pig.
Figure 6:
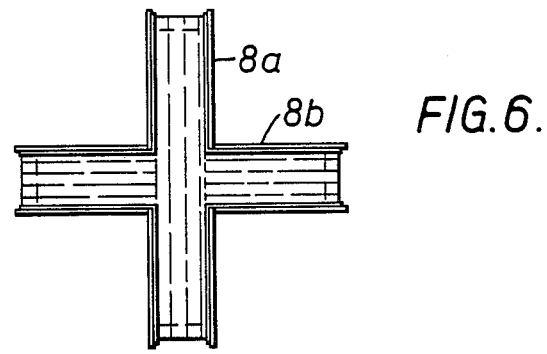
FIG. 6 is a rear view of the coils shown in FIG. 5.

Referring to FIGS. 5 and 6, the sensor or receiver coils 8a, 8b are attached to the front of the pig 6 being arranged as a cross, with one coil being at 90° to the other coil. These coils 8a, 8b generate an output voltage when the magnetic flux generated by the transmitter output coil 4 intersects them. The amount of flux linked into any receiver coil 8 depends on the angle between it and the transmitter coil 4. The angle of the receiver coil 8 varies as the pig 6 rotates during its passage through the pipeline and at some orientations one coil 8 would have no flux linkage. As these coils are crossed a signal may be received by either coil whatever the orientation of the pig. Crossed coils have the advantage that they are orthogonal to flux lines generated by magnetic vehicles and this leads to reduced magnetic noise pick-up.

Figure 7:
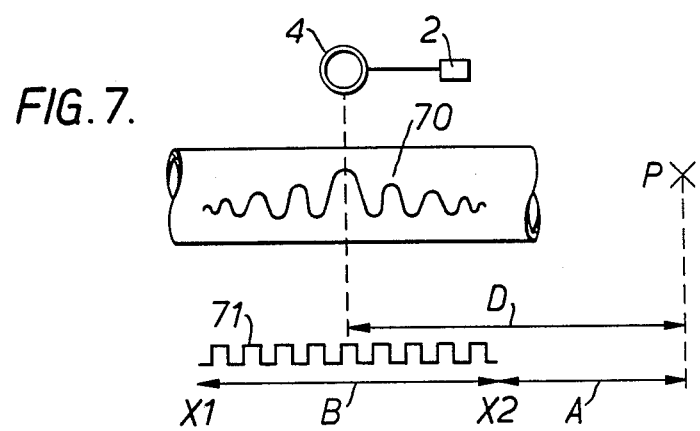
FIG. 7 is a schematic representation of the manner in which the sensed signal is processed to provide the reference pulse at a point which is a known distance from the position of the transmitter output coil.

Referring to FIG. 7, when activated by the transmitter 2 the output coil 4 generates an alternating current and since the transmitter 2 has been activated before the pig reaches it, the signal sensed by the pig sensors will assume the form shown at 70. The signal is symmetrical about the position of the transmitter coil 4, that is, the signal increases as the pig approaches the coil 4, assumes a maximum as the pig passes directly underneath the coil 4 and then dies away as the pig leaves the coil 4. The sensed signal 70 is of course processed by the processing system described with reference to FIG. 3 and is converted to a thresholded square wave pulse train 71 which appears at the outputs of thresholds 42a and 42b in FIG. 3. Thus it will be seen that the centre of the pulse train 71 gives the exact position of the line marker transmitter coil 4. However, the end of the pulse train 71 is reached after the position of the centre is reached. Nevertheless, the following method which is built into the signal processing system of FIG. 4 enables a calculation to be made of the centre of the pulse train.

The pig approaches from the left hand side of the pipeline shown in FIG. 7, and when it enters the transmitter coil region, the operation is as follows:

(i) when the sensed line marker signal 70 exceeds the threshold at X1 (FIG. 7), the footage pulses from the distance transducer at 768 ppm are counted in the counter 51 in FIG. 4 and divided by 4 by being output through output 52b.

(ii) when the sensed line marker signal 70 falls below the threshold at X2 (FIG. 7), counting of the footage pulses divided by 4 is ceased and the value is stored in the word comparator 60 after further division in counter 59. This value is equivalent to half the threshold distance, that is, B/2.

(iii) counting of the footage pulses is continued in region A (FIG. 7) by counter 51, but this count is now divided by 2. These pulses are then added to the B/2 total and stored in the word comparator 60 after further division in counter 59.

(iv) after each footage pulse the cumulative pulse total is compared with D (the preset coincident distance) stored in the coincident distance input 61.

(v) when these totals are equal a reference or line marker pulse is output. This output occurs when the pig is at a fixed preset distance (D) after the coil 4.

The coincidence distance must be large enough to allow the sensed line marker signal to fall below threshold before an output is generated. In other words, distance A must at least equal 0 since if it is less than 0 a distance error will result.

The accuracy of this method of line marking is implicit and does not depend on accurate transmitter activation or vary with pig velocity.

The actual line mark pulse will occur a fixed distance (say 10 m) after the pig has passed the transmitter coil.

The frequency of the magnetic flux signal is 20 Hz, which is low enough not to generate significant and undesirable eddy currents.

The pig detector described detects a magnetic type pig which causes a direct magnetic distrubance in the detector, so that a signal is generated in a receiver coil of the detector unit. When this signal exceeds a preset threshold the transmitter unit is switched on.

It will be appreciated however that it is also possible to detect a "non-magnetic" pig by selection of a suitable detector. The non-magnetic pig will still cause a disturbance to the earth's magnetic field and this can be detected by using a more sensitive magnetometer detector instead of a detector with a simple input coil. The magnetometer signal, however, is still compared to a preset threshold and is used to switch on the transmitter unit.

We claim:

1. A method for correlating a geographical reference point located externally of a natural gas transmission pipeline with a corresponding point in the pipeline, the method comprising moving a pipeline vehicle along the pipeline from an initial position to a final position by way of the geographical reference point, locating a magnetic flux transmitter at the geographical reference point, locating a vehicle detector externally of the pipeline at a point between the transmitter and the initial position of the vehicle, utilising the detector to detect the vehicle before the vehicle is level with the transmitter, causing the detector to activate the transmitter when the detector detects the vehicle, causing the transmitter to transmit magnetic flux of sufficient strength to penetrate the pipeline, utilising a sensor on board the vehicle to sense any flux penetrating the pipeline and to emit a signal upon sensing such flux, said signal having an amplitude which reaches a peak when the sensor is level with the transmitter, and utilising recording means on board the vehicle to record the signal.

2. A method as claimed in claim 1, wherein the transmitter includes an AC coil for transmitting the magnetic flux.

3. A method as claimed in claim 2, wherein the AC coil is supplied with alternating current at a frequency of no more than 30 Hz.

4. A method as claimed in claim 3, wherein the frequency of the alternating current is no less than 16 Hz.

5. A method as claimed in claim 4, wherein the frequency of the alternating current is 20 Hz.

6. A method as claimed in claim 1, wherein the sensor comprises a pair of receiver coils arranged so that their axes are at right angles to each other and so that the axis of each coil is at right angles to the longitudinal axis of the vehicle.

7. A method as claimed in claim 6, wherein the coils are arranged in a cross formation.

8. A method as claimed in claim 1, wherein means are provided on board the vehicle to process the sensed signal so as to output a reference pulse for recording on board the vehicle.

9. A method as claimed in claim 8, wherein the signal processing means outputs the reference pulse as soon as or after the flux has ceased to be sensed by the sensor.

10. A method as claimed in claim 9, wherein the signal processing means outputs the reference pulse when the distance travelled by the vehicle after it is level with the transmitter coincides with a reference distance equal to or greater than half the distance travelled by the vehicle between the points respectively when the sensor first senses the transmitted flux and ceases to sense the transmitted flux.

11. A method as claimed in claim 1, wherein means are provided to limit the period of transmission of the flux.

12. Apparatus for correlating a geographical reference point located externally of a natural gas transmission pipeline with a corresponding point in the pipeline, the apparatus comprising a pipeline vehicle for movement along the pipeline from an initial position to a final position by way of the geographical reference point; a magnetic flux transmitter for location at the geographical reference point, the transmitter being capable of transmitting magnetic flux of sufficient strength to penetrate the pipeline; a vehicle detector for location externally of the pipeline between the transmitter and the initial position of the vehicle, the detector being adapted to activate the transmitter to transmit magnetic flux before the vehicle is level with the transmitter; a sensor on board said vehicle for sensing any flux penetrating the pipeline and for emitting a signal upon sensing such flux, the signal having an amplitude which reaches a peak when the sensor is level with the transmitter; and means for recording the signal.

13. Apparatus as claimed in claim 12, wherein the sensor comprises a pair of receiver coils arranged so that their axes are at right angles to each other and so that the axis of each coil is at right angles to the longitudinal axis of the vehicle.

14. Apparatus as claimed in claim 13, wherein the coils are arranged in a cross formation.

15. Apparatus as claimed in claim 12, wherein means are provided on board the vehicle to process the sensed signal so as to output a reference pulse for recording on board the vehicle.

16. Apparatus as claimed in claim 15, wherein the signal processing means is adapted to output the reference pulse as soon as or after flux has ceased to be sensed by the sensor.

17. Apparatus as claimed in claim 16, wherein the signal processing means is adapted to output the reference pulse when the distance travelled by the vehicle after it is level with the transmitter coincides with a reference distance equal to or greater than half the distance travelled by the vehicle between the points respectively when the sensor first senses the transmitted flux and ceases to sense the transmitted flux.

18. Apparatus as claimed in claim 12, wherein means are provided to limit the period of transmission of the flux.

19. Apparatus as claimed in claim 12, wherein the transmitter includes an AC coil for transmitting the magnetic flux.

20. Apparatus as claimed in claim 19, wherein the AC coil is supplied with alternating current at a frequency of no more than 30 Hz.

21. Apparatus as claimed in claim 20, wherein the frequency of the alternating current is no less than 16 Hz.

22. Apparatus as claimed in claim 21, wherein the frequency of the alternating current is 20 Hz.

23. Apparatus as claimed in claim 12, wherein the pipeline vehicle is a pipeline inspection vehicle.

24. A method of correlating a geographical reference point located externally of a natural gas pipeline with a corresponding point in the pipeline, said corresponding point being located between upstream and downstream points in said pipeline, said method comprising the steps of (1) positioning a magnetic flux transducer at said geographical reference point which, when activated, can emit magnetic flux into said pipeline, (2) providing a pipeline vehicle which can pass through the pipeline, said pipeline vehicle including a sensor and a recording means, said sensor being capable of sensing magnetic flux in said pipeline and then sending a corresponding signal to said recording means, said signal having a maximum amplitude when the magnetic flux is at a maximum, (3) positioning a detector externally of said pipeline at a location that corresponds to a location between said corresponding point and said upstream point in said pipeline, said detector being capable of detecting the approach of said pipeline vehicle in said pipeline and then activating said magnetic flux transducer, and (4) causing said pipeline vehicle to pass through said pipeline from said upstream position to said downstream position; said detector, as said pipeline vehicle approaches it within said pipeline, causing said magnetic flux transducer to emit magnetic flux into said pipeline, and said sensor on said pipeline vehicle sensing said magnetic flux and sending a signal to said detector on said pipeline vehicle as it passes by said geographical reference point, said signal having an amplitude which is at a maximum when said pipeline vehicle passes said corresponding point in said pipeline.

* * * * *